Oct. 2, 1945.  C. L. FITZ  2,385,804
CAMERA
Filed Aug. 15, 1941  4 Sheets-Sheet 1

INVENTOR
CHARLES L. FITZ
BY
Wheeler, Wheeler & Wheeler
ATTORNEYS.

Oct. 2, 1945.   C. L. FITZ   2,385,804
CAMERA
Filed Aug. 15, 1941   4 Sheets-Sheet 2

INVENTOR
CHARLES L. FITZ
BY
Wheeler, Wheeler & Wheeler
ATTORNEYS.

Oct. 2, 1945. C. L. FITZ 2,385,804
CAMERA
Filed Aug. 15, 1941 4 Sheets-Sheet 3
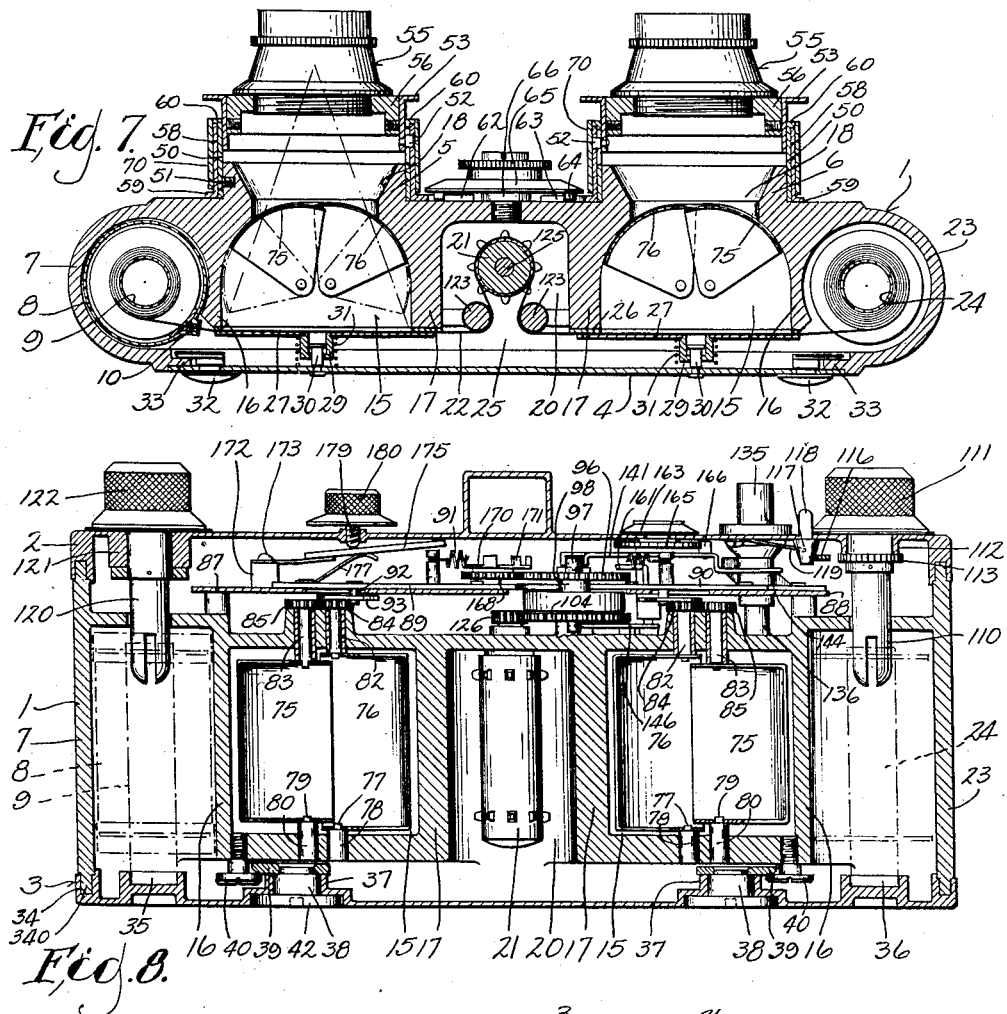
Fig. 7.
Fig. 8.
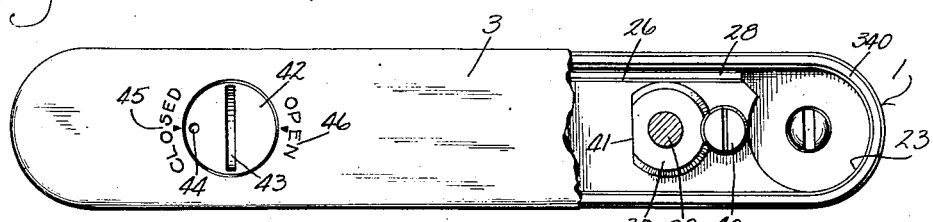
Fig. 9.
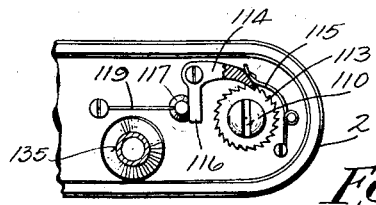
Fig. 10.
INVENTOR
CHARLES L. FITZ
BY
Wheeler, Wheeler + Wheeler
ATTORNEYS Oct. 2, 1945.   C. L. FITZ   2,385,804
CAMERA
Filed Aug. 15, 1941   4 Sheets-Sheet 4

INVENTOR
CHARLES L. FITZ
BY
Wheeler, Wheeler & Wheeler
ATTORNEYS.

Patented Oct. 2, 1945

2,385,804

UNITED STATES PATENT OFFICE 2,385,804

CAMERA

Charles L. Fitz, Three Lakes, Wis., assignor of one-half to Fred Dobbs and one-half to said Fitz, both of Three Lakes, Wis., as copartners Application August 15, 1941, Serial No. 406,942

23 Claims. (Cl. 95—18)

This invention relates to improvements in cameras. It has particular reference to a stereoscopic camera, although many features are useful otherwise.

One of the major objects of the invention is the provision of a novel, improved and simplified compact organization of stereoscopic camera with a novel disposition of the shutters and control mechanism and a novel disposition of the film intermediate the exposed frames thereof, and a novel organization for the utilization of substantially all of the area of a film passed through the camera notwithstanding the necessary spacing of the exposed frames.

Important objects of the invention pertain to the shutter and its control. One important object is to provide novel, improved and simplified means for electromagnetically controlling the rate of shutter operation whereby exposure times are subject to infinite numbers of adjustments within the range of the apparatus without any delicate clock work or other control mechanism which could get out of order. A further major objective so far as the shutter is concerned, has to do with the provision of a novel and improved shutter spring winding mechanism to which motion is transmitted by the film itself from the winding key, so that double exposures are precluded by supplying power for a renewed operation of the shutter only by the movement of the film as it is transported following exposure.

Another object having to do with the shutter control mechanism relates to a novel, improved and simplified means for controlling the transmission of motion from the winding spring to the shutters, and for concurrently operating the shutters before the individual lenses of a stereoscopic camera. Another object has to do with the provision of a single control means arranged for identical operation from "instantaneous" and "bulb" exposures, the nature of the exposure being determined by the rotative position of the control button preliminary to its operation.

Still other objects of the invention have to do with the improvement and simplification of the camera mechanism generally, and the provision of novel and improved focusing lens mounts and focusing connections for the simultaneous focusing of the respective lenses of a stereoscopic camera. Still other objects will be apparent to those skilled in the art upon study of the following disclosure of the invention.

In the drawings:

Fig. 7 is a view through the camera in horizontal section in an intermediate plane.

Fig. 8 is a longitudinal vertical section through the camera.

Fig. 9 is a bottom view of the camera with a portion of the bottom closure plate broken away.

Fig. 10 is a fragmentary detail of the top closure plate of the camera as it appears in bottom plan.

Like parts are identified by the same reference characters throughout the several views.

Figure 1:
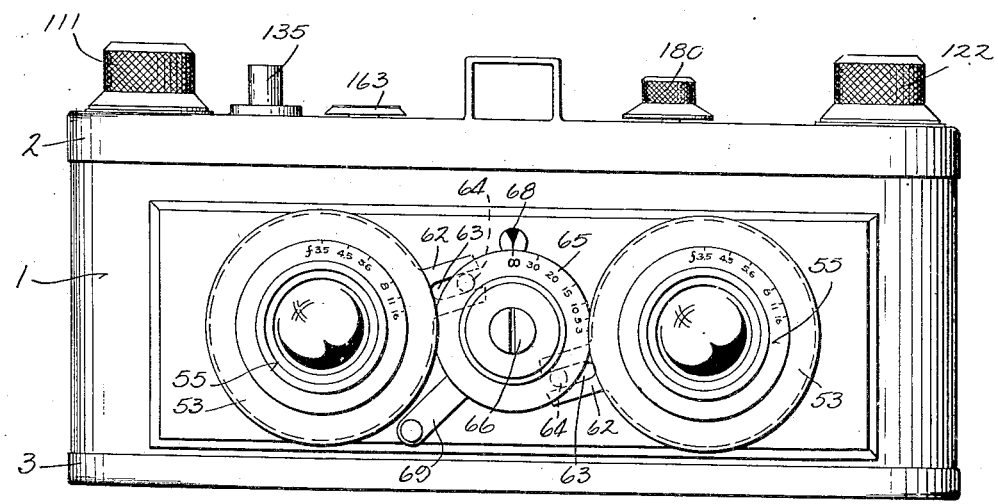
Fig. 1 shows a full size view of the camera in front elevation.

In the particular embodiment of the invention herein disclosed, the case comprises a body portion 1 of molded plastic having a top closure 2, a bottom closure 3, a rear closure 4, and a pair of laterally spaced annular bosses at 5 and 6 for the support of the lens mounts.

Referring to Fig. 7 and Fig. 8, the interior construction of the body portion 1 will be described.

Suitable partition means provides, at 7, a chamber in which the conventional film-containing casette 8 is receivable. The casette or cartridge comprises a metallic sheath and a tubular spindle 9 upon which the film is wound. From a generally tangential light-excluding mouth at 10 the film is delivered.

Adjacent to the casette-receiving chamber 7 is a shutter chamber 15 defined by integrally molded partitions 16 and 17. An outwardly flaring opening at 18 admits light to chamber 15 subject to the control of the shutters therein as hereinafter to be described. A similar chamber of identical form, defined by like partitions, lies behind the annular boss 6 and is identified by like reference characters.

Between the partitions 17 is a film sprocket chamber 20 in which, about the sprocket 21, is guided a loop of film during the use of the camera.

In the right hand end of the case at 23 is a film winding chamber in which there is disposed a winding spool 24. The length of the several partitions 16 and 17 from front to rear is such that these partitions all terminate in a common plane which is well within the removable back 4, leaving a longitudinal passageway at 25 for the film. This passageway 25 opens downwardly toward the bottom closure plate 3 and all portions of the passageway are accessible when the closure plate is removed. The casette chamber 7, the winding chamber 23, and the sprocket chamber 20, likewise open downwardly so that with the camera inverted and the bottom closure plate 3 removed, it is a simple matter to insert and position the casette 8, the spool 24, and the intervening film which is shown at 22 in Fig. 7.

Figure 2:
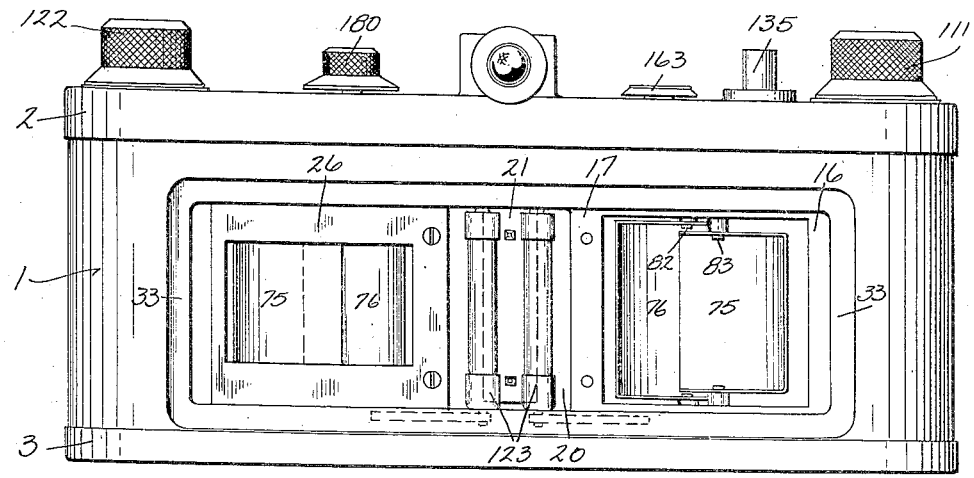
Fig. 2 shows the camera in rear elevation as it appears with the back removed and one of the masking plates removed.

Mask plates 26, suitably apertured to expose the correct film areas, are screwed to partitions 17 and supported likewise on partitions 16. The plates span the respective shutter chambers 15. The particular camera disclosed is designed to use standard 35 mm. film which is perforated along its edges. The area exposed by each of the mask plates 26 (see Fig. 2) is an inch by an inch and a half.

Coacting with each of the mask plates 26 is a pressure plate 27 which holds the film tightly thereto. These pressure plates and the corresponding mask plates are preferably completely planiform over the area traversed by the film, but the pressure plates are desirably outwardly curved at 28 beyond the area traversed by the film to facilitate the guiding of the film into the space between the pressure plates and the mask plates. The pressure plates are provided with pairs of rearwardly projecting sleeves at 29 which receive guide pins 30 mounted on the rear camera closure 4. The guide pins 30 are headed within the sleeves 29 as a means of maintaining the pressure plates in assembly upon the back closure. Light compression springs 31 furnish the pressure by which the pressure plates are urged against the film. Rotatable latch elements 32 at either end of the back closure releasably engage projecting flanges 33 of the case to hold the back detachably to the case.

The bottom closure 3 may conveniently be die cast. A channel at 34 engages the downwardly projecting margin 34a of the body to provide a firm and light tight connection. An integral socket boss at 35 receives the lower end of the casette, such boss being centered with respect to the casette chamber 7 of the body. A similar boss at 36 receives the lower end of the winding spool 24, this latter boss being centered with respect to the winding chamber 23.

Suitable bearings at 37 receive the lower lock members 38 which have beveled locking flanges 39 (Figs. 8 and 9) normally engaged beneath the heads of screws 40 which project from the bottom walls of the shutter chambers 15. Flanges 39 are cut away at 41 and, when turned to present the cut margin 41 for the screws 40, are released from engagement with such screws to permit the free removal of the bottom closure plate 3 from the body portion 1 of the camera. The members 42 of the locking rotors 38 are provided with key slots 43 for the reception of a suitable tool for their manipulation. There is also preferably indicating means comprising the mark 44 on the head and the marks 45 and 46 on the closure plate 3 to indicate when the rotor is in the proper locked and unlocked position. The bottom plate 3 is intended to be removed each time a film is introduced or withdrawn from the camera. The rear closure plate 4 as shown in Fig. 7 has similarly functioning retaining means but will not ordinarily be removed except for special focusing requirement or other special conditions.

The mounting of the lenses and their operation for focusing is as follows.

A metal guide sleeve 50 is held by screw 51 to each annular boss 5 or 6 of the camera at a plurality of points, preferably 3 in number. The guide sleeve 50 is provided with axially extending slots for pins 52 connected with the lens mounting sleeve 53. The lens and diaphragm, which is purchased as an assembled unit designated by reference character 55, is threaded into a mount 56 positioned in the sleeve 53, the whole assembly being unitarily movable axially of the guide sleeve 50 as required by the movement of pins 52 in the axial slots.

Figure 17:
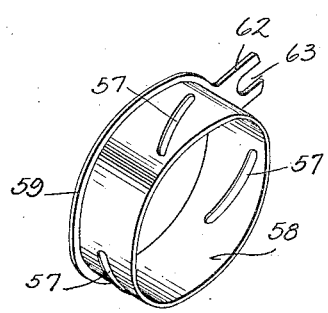
Fig. 17 is an enlarged detail view in perspective of one of the focusing lens mounts.
Figure 18:
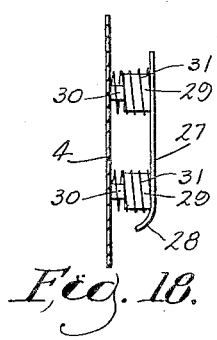
Fig. 18 is an enlarged detail view in transverse section through one of the film pressure plates.

Pins 52 project through the axial slots of the guide sleeve 50 and are engaged externally thereof by the margins of helical slots 57 in the focusing ring 58, this ring being shown in detail in Fig. 17 on sheet 1. At its inner end the focusing ring 58 has a flange 59 which, by abutment with the case body 1, is precluded from moving inwardly. At its outer end the focusing ring 58 is confined by an annular flange 60 projecting radially from the outer end of the guide sleeve 50 as shown in Fig. 7. Obviously, therefore, the focusing ring 58 is precluded from axial movement but is free to rotate about the guide sleeve. In the course of such rotation, the pins 52 engaged in the helical slots 57, will cause an axial inward and outward movement of the lens assembly in accordance with the angular position of the ring 58.

The focusing rings 58 for the respective lens assemblies are each provided with a bifurcated lever arm at 62 slotted at 63 to receive pins 64 which project rearwardly from a calibrated dial 65 mounted for rotation upon a spindle 66 which is screwed into the front of the body casting 1 of the camera case. The calibrations of the dial are read with reference to an indicator at 68 on the camera case and, to facilitate manipulation of the dial, it is provided with a hand lever at 69 (Fig. 1). As the hand lever is swung from side to side the dial is oscillated and motion is imparted from the rearwardly projecting pin 64 to the bifurcated arms 62 to the respective focusing ring 58, the helical slots of which are so pitched as to produce corresponding adjustment of the respective lens assemblies in and out with respect to the camera body.

After the pins 52 are riveted in place in the mounting sleeves 53 to maintain the adjustable assembly of the guide sleeves 50 and the focusing rings 58, the guide sleeves are mounted to the annular bosses 5 and 6 of the camera body by means of screws 51, the focusing ring being provided with suitable openings (not shown) through which the screws 51 may be introduced. The assembly is then finished by pressing a finishing ring 70 rearwardly over the apertured portions of the focusing ring 58.

The shutters 75 and 76 are used in pairs behind each lens. For the purpose of the present invention it is desired to use a butterfly shutter mechanism, each shutter resembling a quarter segment of a light weight metal can having a cylindrical side wall extending through an arc of approximately 50 degrees and having corresponding top and bottom sectors. In each pair of shutters, shutter 76 is slightly longer in axial extent. Its sector-shaped bottom is pivoted upon the reduced end 77 of a relatively short stud 78 mounted in the bottom wall portion of the shutter chamber 15. At a slightly higher elevation the bottom sector of shutter 75 is mounted on the reduced end 79 of stud 80.

Figure 6:
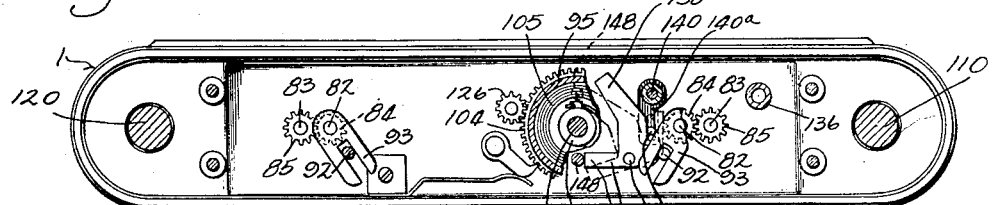
Fig. 6 is a view similar to Fig. 5 showing the mechanism immediately beneath the mounting plate means, such means being broken away.

Aligned with the mounting studs 78 and 80 of the respective shutters 76 and 75 are the corresponding shorter and longer shafts 82 and 83 to which the top sectors of the shutters 76 and 75 are respectively connected. Above the top walls of the shutter chamber 15 the shutter control shafts 82 and 83 are interconnected for opposite oscillation by means of gears 84 and 85 as shown in Fig. 6. The side walls of the respective shutter chambers have substantially cylindrical portions to which the cylindrical sides of the respective shutters are closely fitted. Centrally there is some peripheral overlap between the shutters when they are in closed positions indicated in full lines in Fig. 7. Oscillation of either shaft 82 or 83 will result in opposite movement of the shutters from this position with the dotted line position illustrated in Fig. 7. In this latter position the shutters will clear the cone of light drawn from the optical center of the lens system as shown in broken lines in Fig. 7, allowing complete illumination of the field defined in each instance by the masking plate 26. When the shutters are closed their close abutment with each other and with all surfaces of the body casting 1 about the opening 18 precludes any light transmission from the lens to the film.

Figure 5:
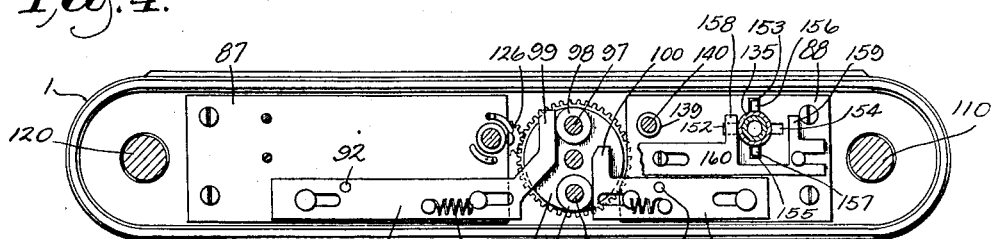
Fig. 5 is a view similar to Fig. 4, showing the mounting plate means and directly associated parts, with most of the superimposed control mechanism broken away.

The shutter control mechanism is quite generally mounted upon a mounting plate means secured to the top of the body portion 1 of the camera. While a single plate may be used, the mounting plate means has, for convenience in the instant device, been divided to comprise two separate mounting plates 87 and 88 as best shown in Figs. 5 and 8. The shutter actuating slides 89 and 90 are guided for reciprocation upon the faces of the respective plates 87 and 88 and normally biased centrally by a tension spring 91 connected to both slides. Pins 92 projecting downwardly from the respective slides 89 and 90 through the mounting plates 87 and 88, are engaged in the bifurcated ends of levers 93 respectively carried by the shutter gears 84, the arrangement being such that in the inner positions of the slides 89 and 90 toward which the slides are biased by the tension spring 91, the shutters are closed but outward movement of the slides is transmitted by pins 92 and levers 93 and the gears 84 and 85 to the respective shutter shafts 82 and 83 to oscillate the shutters to their open positions. The shutter opening movement of the slides is communicated to the slides against the bias of spring 91 by means of a rotor (Fig. 5 and Fig. 12) which comprises a spring housing 95, a gear 96 and posts 97 carrying cam rings 98 bearing against the arms 99 and 100 of the slides 89 and 90 respectively. It will be apparent from Fig. 5 that if rotor 95 be turned 180 degrees its initial turning movement will be communicated by the cam rings 98 and the cam follower arms 99 and 100 to move the respective slides 89 and 90 outwardly against the bias of the tension spring 91. After 90 degrees of rotation of rotor 95 the continued rotation of the rotor throughout the remainder of the assumed 180 degrees of movement will permit the return of the slides 89 and 90 under the bias of tension spring 91 to restore the shutters to their closed position. Thus, in each one half rotation of rotor 95 the shutters will be opened in unison and closed in unison.

The rotor comprising spring housing 95 and gear 96 turns upon a post 102 (Fig. 12) which is screw threaded into the top wall of the film sprocket chamber 20 in the camera body 1 (see Fig. 8). Within the spring housing 95 there is rotatably mounted on the spring post 102 the spring anchoring hub 103 of gear 104. A clock spring 105 coiled within housing 95 is connected at its inner end to the hub 103 and at its outer end to the housing 95. The spring is always wound through gear 104 and its unwinding movement is always delivered through the housing 95. The winding of the spring 105 is accomplished as an incident to the transport of film from one position of exposure to the next in the manner now to be explained.

The usual cross pin in the hollow shaft of the winding spool 24 (Fig. 8) is engaged in a transverse slot in the end of the winding shaft 110, which carries at its upper end a knob 111. Immediately below the bearing provided at 112 in the top closure plate 2 for this shaft, the shaft carries a ratchet 113 to which a bell crank pawl 114 is urged by the biasing spring 115 (Fig. 10). The arm 116 of this pawl is adjacent the conically tapered portion 117 of a push button 118 supported by spring 119, the arrangement being such that shaft 110 may rotate normally only in a winding direction but may be released from the pawl 114 for reverse motion when the push button 118 is depressed.

The shaft or spool 9 upon which the film is wound within the casette 8 (Fig. 7 and Fig. 8) is likewise provided with the conventional cross pin engaged by the slotted end of the rewind shaft 120. This shaft is journaled in bearing 121 of the top closure member 2 and provided with a knob at 122. The knob is used, in the customary manner, to draw the film back into the casette when all of the film has been exposed.

Figure 11:
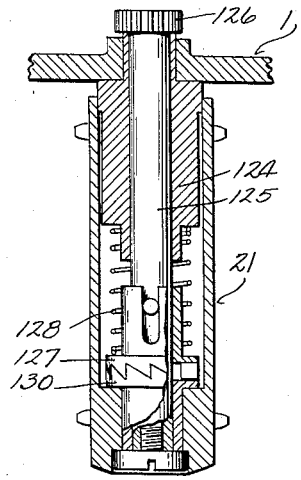
Fig. 11 is an enlarged detail view of the winding sprocket and associated mechansim in vertical section, parts being broken away.

As previously explained, the film in passing the points of exposure, is held to the respective masking plates 26 by the respective pressure plates 27. Between the points at which the film 22 is exposed, the film passes over idler rollers 123 and about the intervening sprocket 21, the detailed construction and mounting of which is illustrated in Figs. 7, 8 and 11.

Made fast in the body 1 at the top of the sprocket chamber 20 is a bearing member 124 within which a shaft 125 is rotatable. This shaft projects upwardly through the body 1 and is provided at its upper end with a pinion 126 meshing with gear 104 to the hub 103 of which the shutter spring 105 is connected. Within sprocket 21 a driven ratchet 127 is splined to the shaft 125 and biased downwardly by a light compression spring 128 into engagement with a complementary driving ratchet 130 which is fixed in the end of the tubular sprocket 21. The arrangement is such that the sprocket turns freely when driven by the film in the course of the film rewinding operation. However, during the winding of the film as actuated by the winding knob 111, the motion of the film is communicated through the driving ratchet 130 to the driven ratchet 127 to rotate shaft 125 and pinion 126 to wind up the torsion shutter spring 105.

The fact that the sprocket 21 is entirely free at its lower end facilitates the threading of the film about the idler rollers 123 and over the sprocket. The dimensions of the parts are critical in order to utilize the film to the best advantage.

Figure 19:
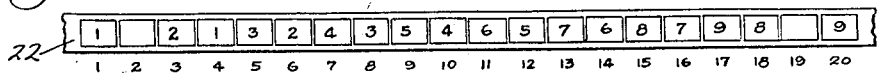
Fig. 19 is a diagrammatic view on a reduced scale showing the manner in which the several frames of pictures taken stereoscopically with the improved camera are disposed throughout the length of a 20 exposure film.

Referring to the space exposed by each of the masking plates 26 as a frame, it is desired in accordance with the present invention, that two complete frames intervene between the frames exposed at the masking plates so that the frame exposed before the right hand lens of the camera will be the third frame beyond the frame exposed before the left hand lens. Arrangement is made for the advance of the film two frames at a time and the resulting pattern of exposures is shown in Fig. 19 where the film strip 22 has twenty frames or exposure spaces which are numbered consecutively below the film. The numbers on the face of the film designate the frames exposed concurrently in each consecutive shutter operation. Thus, the first exposure exposes frames 1 and 4. After transporting the film for a distance equivalent to two frames, the second exposure will expose frames 3 and 6. A further two frame advance will be followed by a third exposure of frames 5 and 8. As clearly shown diagrammatically in Fig. 19, the consecutive advances of two frames and the exposure following each advance of frames which are more distant by 50% than the step of advance, will result in exposing all but two of the available film areas. The two which remain unexposed, regardless of the length of the film, will be the second from the respective ends.

I shall now describe the mechanism by which the shutter is released, before describing the mechanism by which its rate of movement is regulated.

Figure 4:
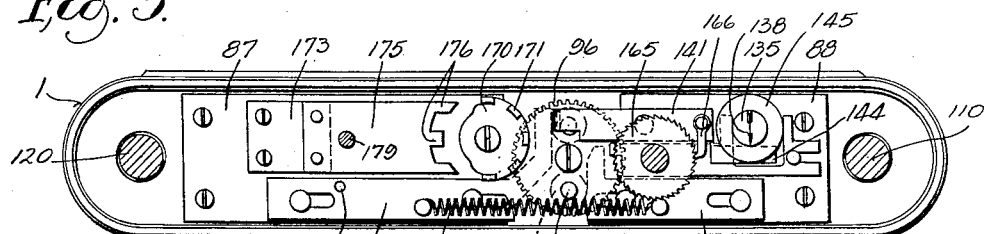
Fig. 4 is a view of the case as it appears with the top plate removed, and the mechanism on a mounting plate exposed therebeneath.
Figure 12:
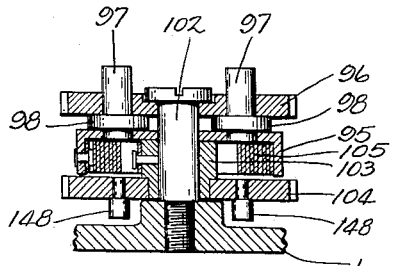
Fig. 12 is an enlarged detail view of the shutter spring mechanism in vertical section.

Reference has already been made to the fact that 180 degrees of movement of the rotor 95 under the torsional influence of the shutter spring 105 is sufficient, as shown in Fig. 5, to open and close the two shutters concurrently. The shutter releasing mechanism for permitting 180 degrees of motion of rotor 95 and the overlying gear 96 is shown in Figs. 4 and 8 and in enlarged detail in Fig. 13 and Fig. 14. The controls operate with reference to the pegs 97, each projecting upwardly from the rotor as shown in Fig. 12.

Figure 3:
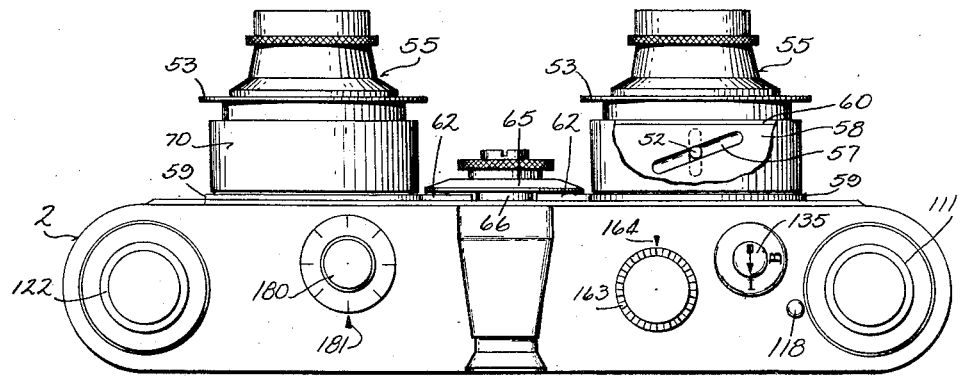
Fig. 3 is a plan view of the camera.

The exposure button 135 comprises a hollow cylinder guided in part by the top closure 2 and in part by a post 136 carried by the body 1 of the camera. The exposure button is yieldably supported by a compression spring 137 (Fig. 14) and may not only be depressed by the operator but may be rotated. The results of its depression will be different according to its rotative position as indicated by the indicator arrow 138 on its upper surface. If the arrow points to the letter I (meaning instantaneous) a simple escapement mechanism will permit approximately 180 degrees of shutter rotation. If the arrow turns 90 degrees to a symbol B (Fig. 3) the shutter rotor will move 90 degrees to open the shutters and will then come to rest and remain at rest until the finger pressure on button 135 is relieved, whereupon the shutters will complete their movement to the initial closed position.

Figure 13:
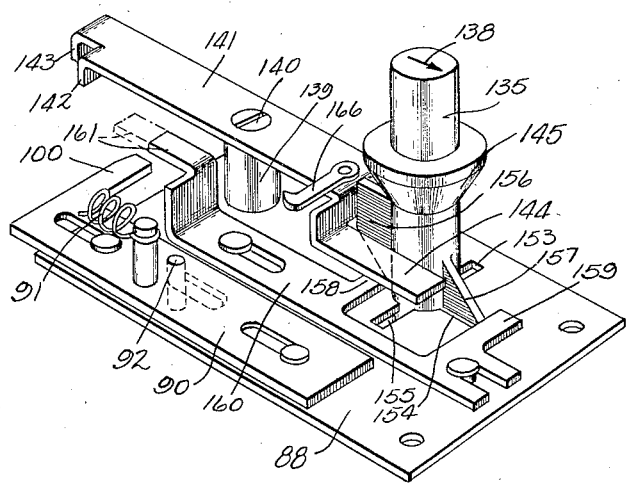
Fig. 13 is an enlarged detail view of the shutter control mechanism in perspective.
Figure 14:
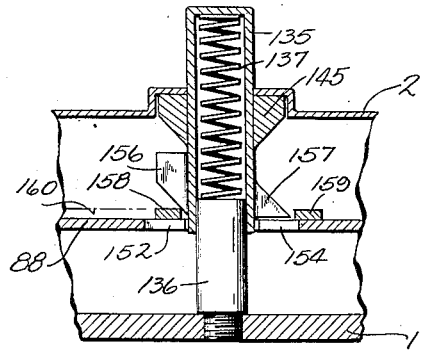
Fig. 14 is an enlarged detail view of the shutter control button in vertical section.

Upstanding from the mounting plate 88 is a bearing 139 for the rock shaft 140 at the upper end of which is mounted the escapement lever 141 (Figs. 6 and 13). The escape member has depending fingers 142 and 143 which are not only spaced laterally at opposite sides of the center line of the lever, but are also spaced radially from the fulcrum of the lever.

At the other end of the lever is an extension arm 144 which projects laterally adjacent to the push button 135 in a position to be acted upon by the conical wedge 145 carried by the push button. When the shutters are closed, the rotor 95 being at rest in the position shown in Fig. 5, this position of the rotor and shutters is determined by engagement of one of the pegs 97 with the finger 143 of the escapement lever 141 (Fig. 4 and Fig. 8). When the exposure button 135 is depressed, its conical wedge 145 acting against the arm 144 of the escapement lever 141 oscillates the lever clockwise as viewed in Fig. 13 and Fig. 4, with the result that the rotor 95, 96, is released and, under bias of the torsion spring 105, operates the shutters.

The clockwise oscillation of the escapement lever 141 from the position shown in Fig. 4 and Fig. 13 results, however, in moving the finger 142 into the path of the next of the pegs 97 and consequently the shutter operating rotor is brought abruptly to rest after approximately 180 degrees of rotation. In the position at which the rotor is brought to rest, its angular displacement is very slightly less than 180 degrees and the shutters are already closed sufficiently to exclude light from the film.

Connected with the escapement lever at the lower end of rock shaft 140 is a rocker arm 140a connected by pin 140b with lever 146 for the oscillation of lever 146 about a fulcrum at 147 (Fig. 6). The clockwise oscillation of the escapement lever 141 as viewed in Fig. 4 has resulted in clockwise return of rocker arm 140a in Fig. 6 with a resulting counter-clockwise oscillation of stop lever 146 about fulcrum 147 from the position in which the parts are illustrated in Fig. 6. Following the film exposing operation of the exposure button 135 as above described, such button becomes wholly ineffectual and repeated depression thereof will not further expose the film since the escapement lever 141 remains in its displaced position until reset by the film winding operation.

When the film is transported by operation of the winding knob 111, the movement thereof communicated through sprocket 21 and pinion 126 to the shutter spring winding gear 104 resets the escapement lever while at the same time limiting the winding movement to the exact amount necessary to transport the film for two frames.

Depending beneath the shutter spring winding gear 104 are pins 148 which are directly beneath the pegs 97 of the shutter actuating rotor 95.

The arms 149 of lever 146, normally lying in the path of rotation of the pin 148 as shown in Fig. 6, have been displaced from such path by the oscillation of the escapement lever 141 and the consequent oscillation of lever 146 in a counterclockwise direction. Arm 149 therefore clears the pin 148 which is shown abutting it in Fig. 6, leaving such pin and the associated winding gear 104 free to permit film transport. In the course of the film winding operation, however, the pin 148 thus freed from engagement of arm 149, will encounter the inclined arm 150 of lever 146 which, in the dotted line position of such lever, now lies in the path of movement of the pin. In consequence of this engagement, the film transporting movement oscillates lever 146 clockwise from its dotted line position to its full line position (Fig. 6), at the same time operating through pin 140b and rocker arm 140a and rock shaft 140 to move the escapement lever 141 in a counterclockwise direction back to the position in which it is shown in Fig. 4, Fig. 8, and Fig. 13.

After the film transport has rotated the shutter winding gear 104 for 180 degrees, the other pin 148 encounters the end of arm 149 of lever 146, such lever having been moved back to its full line position in Fig. 6 as just described. This arrests the film transporting movement and the proportions of the parts are such that a two frame advance of the film is accomplished in each such transporting movement before the film transport is arrested by engagement of one of the pins 148 with the stop arm 149.

Restoration of the escapement lever 141 to the position in which that lever is shown in Figs. 4, 8 and 13, moves finger 142 out of the path of the peg 97 with the result that the shutter actuating rotor 95 is enabled to complete its full 180 degrees of movement before the peg 97 encounters finger 143. The parts are now restored to a position for a further exposure, the film having been transported and the shutter release mechanism reset.

Where time exposure is desired it is necessary in the present device to hold the exposure button 135 depressed continuously for the period of the exposure, the arrangement being equivalent to a so-called "bulb" exposure.

The mounting plate 86 is provided with a cruciform slot centering at the aperture through which the exposure button 135 operates. This slot has arms 152, 153, 154, and 155 respectively. The exposure button 135 carries cam wings 156 and 157 having diagonally beveled cam surfaces. For the instantaneous exposure as above described, the cam wing 156 registers with slot 153 and the cam wing 157 with slot 155. In this position of the parts these cam wings are ineffectual. However, when the exposure button is turned 90 degrees to the position in which it is illustrated in Fig. 13, the cam wing 156 registers with slot 152 and the wing 157 with slot 154, whereby these wings are positioned to coact with arms 158 and 159 of a stop slide 160 (Fig. 13). Stop slide 160 has a stop arm 161 which projects to a position such that when the slide is advanced to the left as viewed in Figs. 8 and 13 the arm 161 is projected into the path of one of the pegs 97 at a midpoint such as to stop the shutters in their wide open positions. Such an advance of slide 160 to the left is effected by engagement of the cam wing 156 with arm 158 of slide 160. The release of the shutter by the conical wedge 146 and the displacement escapement lever 141 is accomplished exactly as in the case of an instantaneous exposure but, in this position of the exposure button, the extension of arm 161 into the path of one of the pegs 97 arrests the shutter in its wide open position and holds it there so long as the exposure button continues to be depressed.

As soon as the exposure button is released, being urged upwardly by its compression spring 137, the cam wing 157 acts upon the under margin of the arm 159 of slide 160 to move such slide in a retracting direction whereby its arm 161 is retracted from its dotted line position to its full line position out of the path of the peg 97, thereby permitting the shutter actuating rotor to continue its movement and to close the shutters.

While it is not at all essential to the operation of the device as a camera, I prefer to provide on the top closure plate 2 of the camera a counter 163 suitably graduated to indicate the number of exposures and movable with reference to a fixed indicating point 164 on the top plate. The counting disk 163 is connected beneath the top closure plate 2 with a ratchet 165 (Fig. 8) which, upon each actuation of the escapement lever 141 is advanced by means of a pawl 166 carried by such lever and best shown in Fig. 13.

Having described the mechanism for controlling the starting and stopping of shutter movement, I shall now describe the regulating device which controls the rate of shutter movement. Reference has already been made to the fact that a gear 86 is a part of the shutter actuating rotor 95 (Figs. 8 and 12). Through this gear the regulating mechanism operates to determine the rate of shutter movement.

Figure 15:
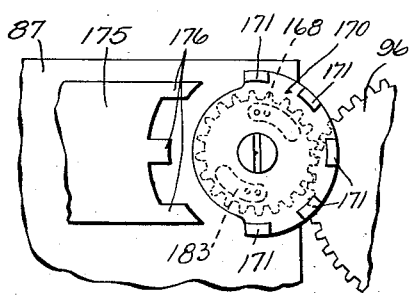
Fig. 15 is an enlarged detail view in plan of the electromagnetic control mechanism.

Gear 96 meshes with a pinion 168 preferably made of ferrous or other magnetic material if one alternative feature of the invention is to be incorporated. This pinion, rotatable upon the mounting plate 87, carries an armature member 170 having upstanding poles at 171 about approximately one half of its periphery, the remaining portion of its periphery being cut away and left without poles as best shown in Figs. 15 and 16.

At a point remote from the rotatable armature 170 a support 172 (Fig. 8) carries a leaf spring 173 or some other hinge arrangement for the adjustable support of a bar magnet 175. The magnet has poles 176 at its end, such poles being arranged to terminate in an arc concentric with the axis of the pinion 168 and immediately adjacent the path of rotation of the armature poles 171 (Figs. 4 and 15). The upward bias of the hinge spring 173 upon the magnet 175 may be supplemented by the upward bias of a supplemental supporting spring 177, if desired (Fig. 8). Threaded into the top closure plate 2 of the camera is an adjusting set screw 178 which bears against the magnet and carries a control knob 180 suitably calibrated in terms of shutter exposure and movable with respect to a fixed indicating point 181 on the top of the camera.

Figure 16:
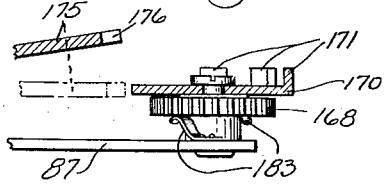
Fig. 16 is an enlarged detail view of the electromagnetic control mechanism in longitudinal section.

Fig. 8 and the full line position of Fig. 16 show the bar magnet 175 in its position of maximum retraction with its poles 176 remote from the complementary pole 171 of the armature 170. While the retraction might be horizontal in the plane of the armature, the pivotal retraction makes possible a more delicate control with more simple control mechanism. The farther the armature is advanced by the screw 180 toward the dotted line position of Fig. 16, the greater will be the magnetic interaction between the magnet 175 and its armature 170 in the course of armature rotation. This advance of the magnet is accomplished within a single rotation of the knob 180 so that there need be no confusion with respect to calibrations.

The movement of an armature with respect to a magnet creates hysteresis currents establishing a counter-magnetic force tending to resist rotation. The increase in the number of poles has been found to accentuate this effect. By varying the spaces between poles of the magnet and the poles of the armature, it has been found possible to control exposure times with great accuracy and over a wide range, thus eliminating the complex gear systems ordinarily used for this purpose.

For the purposes of the present regulating mechanism only a single gear is used and this plays no part in the timing operation but merely speeds up the armature with reference to the shutter so that when the shutter actuating rotor makes one half rotation (for a single shutter operation) the armature makes a full rotation.

It is desired to have the shutter open as rapidly as possible and to have the retarding movement primarily effective during the period when the shutter is open. This is accomplished by cutting away the armature so that during its initial, as well as its final movement, there is no interaction between the armature and the magnet. It is only after the shutter has opened that the interaction between the poles of the armature and the poles of the magnet become effective to regulate the open shutter period.

In cases where further control is necessary, the spring 173 or other magnet supporting hinge, as well as the supporting block 172, the mounting plate 87, and the pinion 168, are all made of ferrous or other magnetic material and soft and relatively magnetically conductive springs 183 fastened on the mounting plate 87 bear on the under surface of the pinion 168, the flattened terminal portions of the spring serving instead of other friction shoes. It will be found that the closer the magnet approaches the armature, the greater will be the magnetic attraction between the shoes at the ends of the springs 180 and the pinion. The friction developed between the springs of the pinion further retards shutter movement to a degree which is controllable with substantial accuracy by the adjustment of the magnet.

Thus, the adjustment of a magnet accomplishes two separate means of control, either of which may be used individually and both of which are regulated by a single movement.

I claim:

1. In a stereoscopic camera, the combination with means for displaying film at spaced lengths, of individual shutter mechanisms for exposing film displayed at such points and corresponding masks determining the frames of film exposed at such points, means providing a film loop intermediate the respective masks for the support of the intervening film upon a path of such length that two frames of film are disposed between the frames exposed at the respective masks, and film transporting means for advancing the film two frames in each given operation, said film transporting means including a stop operative to limit the film advance to two frames, together with manually operable means independent of said transporting means for releasing said stop, actuation of said releasing means being prerequisite to further film transport the film guiding means intermediate the points of film exposure including a rotor film-operated during the transport of the film and provided with operative connections to said stop means.

2. The device of claim 1 in combination with a shutter operating spring having a winding rotor and motion transmitting connections from said film-operated rotor to said spring winding rotor for winding of said spring as an incident to the transport of said film, said spring having operative connections to the respective shutter mechanisms for the actuation thereof and requiring movement in an unwinding direction of said spring equivalent to that supplied in a winding direction to said spring in the course of film transport.

3. A stereoscopic camera comprising a body having spaced forwardly disposed lenses and light transmitting chambers opening rearwardly behind said lenses, shutter mechanisms operatively disposed in the respective chambers, said case having at its opposite ends a film supply chamber and a film winding chamber and having adjacent its center a film sprocket chamber intermediate the light transmitting chambers aforesaid, the film supply, film sprocket, and film winding chambers opening downwardly, said case having a back and a channel adjacent its back affording film communication between the film supply, film sprocket, and film winding chambers, said channel also opening downwardly and communicating with the light transmitting chambers, a bottom closure having an operative detachable connection with said case and adapted to afford access to the film supply, film sprocket, and film winding chambers and the communicating channel, masking means at the rear of the respective light transmission chambers adjacent the channel, pressure plates operatively mounted upon the camera back and provided with mounting means biasing them toward the respective masking means, said masking means defining the frames of film exposed upon the opening of said shutter mechanisms, a winding spool in the film winding chamber for the transport of film across the respective masking means, film guiding means in the film sprocket chamber including a sprocket over which film between the masking means is disposed in a loop defining a film path intermediate the masking means of a length such that two frames of film intervene between the frames exposed at the respective masking means, shutter operating and film transport control mechanism including a shutter actuating spring and means for the operation of said shutter mechanism from said spring, a spring winding rotor adapted to restore to said spring the tension required for each actuation of said shutter mechanisms, stop means for limiting the winding rotation of said rotor to the amount of motion required for the restoration of such tension, and motion transmitting connections from the sprocket to the rotor for winding the shutter spring as film is transported, said connections being of such ratio that the stoppage of the spring winding rotor occurs when the film has been transported the distance equal to two successive frames.

4. In a camera, the combination with a shutter release button mounted for axial and for rotative movement, of shutter operating mechanism including a spring motor and a rotor driven thereby provided with stop means, an escapement member having a plurality of parts selectively engageable with said stop means in different positions of said member, means operable in the axial movement of said button for actuating said member to release said stop means, whereby to permit predetermined rotation of said rotor for shutter actuation, a separate rotor arresting means positioned to engage said rotor in intermediate position when advanced, and means operable only in one angular position of said button for advancing and retracting said rotor arresting means, said rotor arresting means, when advanced, being adapted to arrest rotor movement in a position in which the shutter is open.

5. In a stereoscopic camera, the combination with a plurality of shutter mechanisms and means for supporting film at spaced points behind said shutter mechanisms for exposure when said shutter mechanisms are open, film guiding means including a sprocket intervening between the film supporting means and the shutter mechanisms and about which is looped a portion of said film at least equal in length to twice the length of the film exposed behind each of said shutter mechanisms upon the opening thereof, means for transporting said film and thereby rotating said sprocket, shutter actuating means including a motor having a winding rotor and a driving rotor and a spring connected between said rotors, shutter operating connections from the driving rotor for the opening and closing of the respective shutter mechanisms in the course of approximately one half of one rotation of the driving rotor, a detent adjustable to and from operative position and effective in its operative position to engage the winding rotor for restraining further movement thereof upon approximately one half of one rotation thereof, the connections of said sprocket to said winding rotor being such as to limit the film transport in each operation to approximately two frames of movement, and mechanism controlling the driving rotor comprising an escapement lever having a fulcrum and provided with a plurality of fingers spaced radially from said fulcrum and laterally with respect to said rotor and disposed over said driving rotor, pins approximately 180 degrees apart on said driving rotor and positioned for successive engagement with the fingers of said escapement lever, an operative connection from said escapement lever to said detent, said detent including means engageable by said winding rotor for restoring said detent to its operative position when released by movement of said escapement lever, a manually operable button provided with wedge means for oscillating said escapement lever in one direction, said lever being returned in the opposite direction by its connection with said detent.

6. In a stereoscopic camera, the combination with a camera body and a plurality of spaced shutter mechanisms each comprising a pair of shutters interconnected for concurrent movement, of a slide associated with each mechanism and having a shutter actuating connection, the opposite movement of said slides in one direction being adapted simultaneously to open the shutters and in the opposite direction to close the shutters, means biasing said slides for opposite movement in a shutter closing direction, said slides having oppositely projecting arms, a spring motor having a rotor provided with oppositely disposed cam means between said arms adapted in the rotation of said rotor to actuate said slides in opposition to their bias and thereafter to control the movement of said slides in accordance with their bias, escapement mechanism limiting said rotor to approximately 180 degrees of rotation in each operation, whereby to open and close the shutters simultaneously, and a manually operable shutter trip means connected with said escapement mechanism for the actuation thereof in a direction to release the rotor for such rotation.

7. In a camera, the combination with a case provided with a light admitting opening at its front and with means for supporting a sensitized medium behind said opening, said case being provided with a chamber between said opening and said supporting means having two generally cylindrical side walls portions, and a pair of shutter elements within the chamber, each comprising a segment, one of said segments being longer than the other and said segments being provided with separate and laterally offset fulcrums and adapted in one position to overlap, the cylindrical side wall portions of said chamber being substantially concentric with the respective fulcrums of said shutter elements, and the respective shutter elements being closely fitted to the respective wall portions in light excluding relation thereto, and means for simultaneously actuating said shutters in opposite directions from their position of overlap, said shutters in the said position of overlap being fitted sufficiently tightly to each other and to the said cylindrically walled portions of the chamber to substantially exclude light from a sensitized medium supported as aforesaid and in the open position of said shutters to freely expose such medium to light admitted through such opening.

8. In a stereoscopic camera, the combination with a plurality of shutter mechanisms and means for supporting film at spaced points behind said shutter mechanisms for exposure when said shutter mechanisms are open, film guiding means including a sprocket intervening between the film supporting means and the shutter mechanisms and about which is looped a portion of said film at least equal in length to twice the length of the film exposed behind each of said shutter mechanisms upon the opening thereof, means for transporting said film and thereby rotating said sprocket, shutter actuating means including a motor having a winding rotor and a driving rotor and a spring connected between said rotors, shutter operating connections from the driving rotor for the opening and closing of the respective shutter mechanisms in the course of approximately one half of one rotation of the driving rotor, a stop adjustable to and from operative position and effective in its operative position to engage the winding rotor for restraining further movement thereof upon approximately one half of one rotation thereof, the connections of said sprocket to said winding rotor being such as to limit the film transport in each operation to approximately two frames of movement, and mechanism controlling the driving rotor comprising an escapement lever having a fulcrum and provided with a plurality of fingers spaced radially from said fulcrum and laterally with respect to said rotor and disposed over said driving rotor, pins approximately 180 degrees apart on said guiding rotor and positioned for successive engagement with the fingers of said escapement lever, an operative connection from said escapement lever to said detent, said detent including means engageable by said winding rotor for restoring said detent to its operative position when released by movement of said escapement lever, and a manually operable button provided with wedge means for oscillating said escapement lever in one direction, said lever being returned in the opposite direction by its connection with said detent, together with an independent means for interrupting motion of said driving rotor at a point intermediate release of one of said pins by one of said fingers and in the engagement of the other of said pins by the other of said fingers, said button being mounted both for axial and for rotative movement and being provided with cam means adapted in one rotative position of the button to operate said independent means when the button is depressed and to retract said independent means when the button is retracted.

9. A stereoscopic camera comprising a lens mounting body portion having spaced rearwardly opening light transmitting chambers, shutter mechanism operatively controlling light transmission through the respective chambers toward the rear of said body, said body being provided with partition means defining a central film sprocket chamber, and film spool chambers located at the ends of the body and a rear channel substantially the full height of the film spool and film sprocket chambers and affording communication therebetween behind the respective light transmitting chambers, the film and film sprocket chambers and said channel opening downwardly, a bottom closure operatively connected to the body and adapted upon its removal to expose the downwardly opening chambers and channel for the threading of a film therein, film guiding means at the rear of the exposure chambers in said channel comprising masking plates and pressure plates for supporting film for exposure upon the opening of the shutters, a film sprocket in the film sprocket chamber, a support upon which said sprocket is rotatable, said support being wholly mounted from above, whereby said sprocket is fully exposed upon removal of said bottom closure, film transporting means for winding film into one of the film spool chambers, such film being threaded about said sprocket and between the pressure and masking plates, shutter operating mechanism including shutter spring means having a winding rotor, and motion transmitting connections from said sprocket remote from the path of said film to said rotor for the winding of said spring means when the film is transported.

10. A stereoscopic camera comprising the combination with two shutter mechanisms movable between open and closed positions, of members operatively connected to said mechanisms and movable oppositely to open the respective mechanisms and movable toward each other in the closing of the respective mechanisms, means biasing said members for movement toward each other, cam followers carried by said members, and a motor driven rotor provided with escapement mechanism limiting it to 180 degrees of rotation in each operation, said rotor including diametrically opposite cam means engageable with the cam follower means of the respective members and disposed transversely between said cam follower means when at rest, whereby each rotor operation will actuate said members oppositely against their bias to open the respective shutter mechanisms and release said members for movement with their bias for the closing of the respective shutter mechanisms.

11. In a stereoscopic camera, the combination with a plurality of shutter mechanisms movable between open and closed positions, of an intervening film sprocket adapted to receive motion from the film transport and disposed between said shutter mechanisms, means for transporting film over said sprocket and past said shutter mechanisms, a shutter actuating motor including a winding rotor in operative connection with said sprocket to receive motion therefrom, a stop means for limiting said winding rotor to 180 degrees of rotation in each operation, the driving connections between the sprocket and said rotor being such as to accommodate the desired film transporting advance when said stop means is effective upon said rotor, a spring connected with said rotor to be wound thereby, a driven rotor connected with the other end of said spring to be rotated in the unwinding of said spring, means controlling the operation of the driven rotor including an escapement mechanism limiting it to 180 degrees rotation in each operation, motion transmitting connections from the escapement mechanism to said stop means, whereby each resets the other, cam pins carried by the driven rotor and normally disposed transversely between said shutter mechanisms, shutter operating members movable in opposite directions to open the respective shutter mechanisms and movable toward each other to close said mechanisms, spring means connecting said members and biasing them for movement toward each other in shutter closing directions, and cam follower elements carried by said members and disposed in the path of movement of the pins on the driven rotor for the control from said rotor of the opening and closing movements of said shutter members.

12. In a camera, the combination with a shutter, of a shutter actuating motor including a rotor having two stop elements approximately 180 degrees apart, means for transmitting motion from the rotor to the shutter for the opening of the shutter in a first 90 degrees of rotor motion, and the closing of the shutter in a second 90 degrees of rotor motion, an escapement lever movable between two positions, a pair of fingers carried by said lever, one of said fingers being located to engage a stop pin of said rotor in one lever position and release it in the other, the other of said fingers being adapted to release a stop pin of said rotor in said first position and engage it in the other whereby, upon manipulation of said lever between said positions, said rotor will be released for slightly less than 180 degrees of movement to open and close said shutter mechanism, together with an independent rotor arresting means movable to and from the path of one of said pins at an intermediate position to arrest said rotor with the shutter open, and a single shutter releasing member provided with means for actuating said escapement lever and said independent arresting means in one position of said member and adapted to actuate only said lever in another position of said member, said member being mounted for a selecting adjustment and an actuating movement.

13. In a camera, a shutter controlling device comprising the combination with a shutter actuating rotor and spring means for the operation thereof, of a plurality of pins projecting from the rotor, an escapement lever pivoted for movement with respect to the rotor and having a plurality of stop fingers inter-engageable with said pins and offset radially and laterally of the lever with respect to each other, a control button reciprocable transversely of the path of lever oscillation, and a conical wedge carried by said button, said lever having a portion in the path of said wedge to be engaged and forced laterally thereby for the oscillation of said lever.

14. In a camera, a shutter control mechanism comprising the combination with a push button, of a shutter actuating member biased for movement in a shutter actuating direction, an escapement mechanism controlling the movement of said member, means carried by said button for operating said escapement mechanism in a direction to release said member for a predetermined movement and thereupon to re-engage said member, an independent stop element movable into the path of movement of said member intermediate the point of release and the point of re-engagement thereof and retractible from said path, cam wings carried by said push button and oppositely beveled and disposed for the advance of said stop element into the path of movement of said member when said button is depressed, and for the retraction of said element from the path of movement of said member when said button is released, said button being biased for outward movement when released.

15. In a camera, the combination with a pair of cylindrically contoured segmental shutters normally overlapped and oscillatable in opposite directions for opening and closing movements, of means connecting said shutters for concurrent operation in opposite directions, a spring motor comprising a rotor, operative motion transmitting connections for the actuation of said shutters, said connections being biased to actuate said shutters toward their normally closed positions, means on said rotor for actuating said connections through a partial rotation of said rotor in opposition to the bias of said connections whereby to open the shutters, said means on said rotor releasing said connections during a subsequent partial rotation of said rotor for the closing of said shutters in accordance with the bias to which said operating connections are subject, and an escapement mechanism controlling rotor operation and comprising stop means on said rotor, and detent means movable between two positions for arresting and releasing said rotor, the movement of said rotor continuously in one direction being adapted first to open and then to permit the closing of said shutters respecting each other 16. In a stereoscopic camera, the combination with a case provided with front, back, top, bottom and end walls and having a central sprocket chamber opening downwardly, shutter chambers at either side of the sprocket chamber, film spool chambers adjacent said end walls, and a film channel extending between said film spool chambers along the inside of the back wall of the case behind said shutter chambers and opening into the sprocket chamber and also opening downwardly toward the bottom wall; of lens mounts and lenses mounted on the front of said case and opening optically toward the respective shutter chambers, shutters in the respective shutter chambers in a position to intercept light admitted through said lenses and lens mounts, film guide means behind the respective shutter chambers, and a sprocket disposed in the sprocket chamber forwardly of said film guide means, said end wall being removable and the respective spool and sprocket chambers and film channel and the sprocket in said sprocket chamber being fully exposed upon the removal of said bottom wall for the introduction and removal of film.

17. The camera set forth in claim 16 in which shutter operating and control mechanism and film transport mechanism is mounted wholly above the said shutters and sprocket whereby not to interfere with access to said film channel and sprocket upon removal of said bottom wall.

18. The camera as set forth in claim 16 in which said case is provided with wind and rewind mechanism in the respective film chambers wholly supported from above, a shutter operating motor above said chambers, a shaft supported from above the sprocket chamber upon which the sprocket is rotatable, an overrunning clutch between said sprocket and shaft whereby motion derived from the film in the winding thereof is transmitted from the sprocket to the shaft, means for communicating motion from the shaft to the motor for the winding thereof, and shutter operating connections from the motor including shutter control means located above said chambers in said camera.

19. The camera set forth in claim 16 in which the shutters in the respective chambers comprise cylindrical segments provided with separate supporting pintles upon which the segments are respectively oscillated to and from engagement, walls of the respective shutter chambers on opposite sides thereof being respectively concentric with the respective pintles, the respective shutters being in light excluding relation to the said walls whereby to exclude from passage through the shutter chambers any light except such as is admitted between the said shutters in the opening thereof.

20. In a stereoscopic camera, a case having back and front walls, the front wall being apertured and provided with lens mountings in materially spaced relation and the case being internally provided with partition means extending rearwardly from its front wall and terminating in spaced relation to its rear wall to provide a film guide channel adjacent the rear wall of the case, said partition means dividing the interior of the case into film pockets adjacent the respective ends of the case, shutter chambers immediately behind the respective lens mountings, the partition means at either side of the shutter chambers comprising masking means defining frames of film in said channel for exposure behind said lens mountings, and a film sprocket chamber intermediate the shutter chambers, the several chambers all opening rearwardly to the film channel, film guide means including idlers and a sprocket in the film sprocket chamber and disposed forwardly of the film channel and adapted to accommodate two consecutive frames of film intermediate the frames exposed by said masking means, oscillatory shutters respectively mounted in the respective shutter chambers, and film transporting means for advancing film from one of said pockets toward the other in successive steps of two film frames each.

21. A camera comprising the combination with a film case, a lens, a shutter, a shutter-operating motor and a trip for controlling the release of said motor for shutter operation, of a shutter control including a time setting member having means calibrating it for indicating exposure duration, connections from the shutter motor to the shutter for opening and closing the shutter in a single operation of said motor upon release of said trip, said connections including a magnetic element mounted for rotation, a second magnetic element having a portion bodily adjustable to and from the plane of rotation of the first element and in operative interaction therewith, and an operative connection from the time setting member to said second magnetic element for adjusting it to and from the first element in accordance with the calibrated setting of said member whereby magnetically to regulate the duration of the period for which the shutter will remain open in the opening and closing movement thereof by said motor.

22. The device of claim 21, in which the respective elements have toothed pole portions, and the second element is pivoted at a point remote from the first element for oscillation of its toothed portion to and from the plane of rotation of the toothed pole portions of the first element.

23. The device of claim 21, in further combination with a magnetic shoe frictionally bearing on the rotatable magnetic element, and a mounting for said shoe and for the second magnetic element of magnetically conductive material, whereby to establish a magnetic circuit including the second element, the shoe and the rotatable element, the shoe being variably pressed into frictional engagement with the rotatable element by the variation in magnetic attraction between the shoe and the rotatable element according to the adjustment of the second element.

CHARLES L. FITZ.